US011719568B2

(12) United States Patent
Lind et al.

(10) Patent No.: US 11,719,568 B2

(45) Date of Patent: Aug. 8, 2023

(54) PARALLEL MODE GRAIN CART SCALE APPARATUS AND METHOD

(71) Applicant: Farmers Edge Inc., Winnipeg (CA)

(72) Inventors: Jeffrey M. Lind, Omaha, NE (US); Ronald W. Osborne, Jr., Omaha, NE (US)

(73) Assignee: Farmers Edge Inc., Winnipeg (CA)

( * ) Notice: Subject to any disclaimer, the term of this patent is extended or adjusted under 35 U.S.C. 154(b) by 196 days.

(21) Appl. No.: 17/083,919

(22) Filed: Oct. 29, 2020

(65) Prior Publication Data

US 2021/0131855 A1 May 6, 2021

Related U.S. Application Data

(60) Provisional application No. 62/928,020, filed on Oct. 30, 2019.

(51) Int. Cl.

| | |
|---|---|
| ***G01G 19/12*** | (2006.01) |
| ***B62B 5/00*** | (2006.01) |
| ***A01B 76/00*** | (2006.01) |

(52) U.S. Cl.

CPC ............ *G01G 19/12* (2013.01); *A01B 76/00* (2013.01); *B62B 5/00* (2013.01)

(58) Field of Classification Search

CPC ............ G01G 19/12; A01B 76/00; B62B 5/00

See application file for complete search history.

(56) References Cited

U.S. PATENT DOCUMENTS

| | | | | |
|---|---|---|---|---|
| 6,150,617 | A * | 11/2000 | Hart | G01G 19/08 177/136 |
| 6,396,003 | B1 * | 5/2002 | Friesen | G01G 19/08 177/136 |
| 6,525,276 | B1 * | 2/2003 | Vellidus | A01D 41/127 177/136 |
| 6,919,516 | B2 * | 7/2005 | Frye | G01G 23/3728 177/199 |
| 9,939,313 | B2 * | 4/2018 | Dai | G01G 21/28 |
| 2007/0181350 | A1 * | 8/2007 | Kranz | G01G 19/08 177/136 |

* cited by examiner

*Primary Examiner* — Randy W Gibson

(74) *Attorney, Agent, or Firm* — Ryan W. Dupuis; Kyle R. Satterwaite; Ade & Company

(57) ABSTRACT

An apparatus is provided for use with an original equipment manufacturer (OEM) scale associated with a grain cart. The apparatus includes a real-time telemetry weight device operatively connected with the OEM scale. The apparatus is configured to allow for a parallel mode of operation which provides for simultaneous operation of the real-time telemetry weight device and the OEM scale without interference while using a same set of load cells.

20 Claims, 3 Drawing Sheets

PARALLEL MODE GRAIN CART SCALE APPARATUS AND METHOD

This application claims the benefit under 35 U.S.C. 119(e) of U.S. provisional application Ser. No. 62/928,020, filed Oct. 30, 2019.

FIELD OF THE INVENTION

The present invention relates to a real-time telemetry weighing device installed on farm implements, and more particularly, the present invention relates to the use of a telemetry device for capturing harvest weight data where the device operates in parallel with existing grain cart scale heads.

BACKGROUND

Yield maps offer valuable sources of spatial data for precision agriculture. These maps provide enhanced visualization to help in measuring the season's yield more precisely. Accurate data is therefore vital to yield maps. It is essential to remove data points that do not accurately represent yield at a corresponding location to aid in data interpretation. Data points are collected with grain cart scales measuring crop weights during harvest.

Harvest weights captured by grain cart scales will fluctuate as the implement moves across the field as well as when the grain cart is filling or emptying. Received data is usually cleaned to remove errant values so the user is presented with the actual weight in the grain cart. Information is then typically downloaded to a USB device or sent to an online account for use in the creation of load tickets and yield maps.

A larger set of features and functionality available in an all-in-one farm management system, not available in the original equipment manufacturer (OEM) hardware, can be obtained in the prior art by replacing the OEM scale device used to calculate grain weight on a grain cart. Modifying the grain cart in this manner however introduces a risk of impacting other OEM operating procedures associated with the grain cart. As such, a method to run a real time telemetry device for capturing harvest weight data where the device does not interfere with the existing grain cart scale head is desirable.

SUMMARY OF THE INVENTION

According to one aspect of the present invention there is provided an apparatus for use with an agricultural cart for transporting an agricultural product therein including existing load cells and an existing scale device in communication with the existing load cells so as to be arranged to deliver an excitation voltage to the load cells and measure a differential voltage output by the existing load cells to determine a weight of the agricultural product, the apparatus comprising:

a telemetry scale device arranged to be operatively connected to the existing scale device and the existing load cells;

the telemetry scale device being arranged to measure the differential voltage output by the existing load cells and determine the weight of the agricultural product in the grain cart without interference to the existing scale device.

Methods and systems in this disclosure improve current scale hardware capabilities through parallel mode operation. According to the preferred embodiment, any manufacturer's product that uses a constant excitation voltage can be targeted for use with this real-time telemetry device.

This system runs in parallel with an existing OEM scale that provides fixed excitation voltage, contrary to related prior art systems that can replace an existing scale indicator on a grain cart but cannot operate in parallel mode. These related prior art systems thus do not address any ability to read existing scale voltage and calculate gain provided from load cell resistance. When operating a telemetry scale device in parallel with the existing OEM scale, a grower retains all of the OEM equipment on the grain cart and tractor, thus affording technology improvement without risk or impact on operating procedures. Information can be collected more frequently than with the OEM system alone and may be sent live to the cloud.

Preferably the telemetry scale device is arranged to measure the excitation voltage delivered to the existing load cells by the existing scale device for use in calculating weight.

In preferred embodiments, the telemetry scale device is also arranged to deliver an auxiliary excitation voltage to the existing load cells independently of the existing scale device.

The apparatus may further comprise a switching device operatively connected between the telemetry scale device and the existing load cells in which the switching device is arranged to operate the telemetry scale device in a primary mode or in a parallel mode. In the primary mode, the telemetry scale device is arranged to deliver an auxiliary excitation voltage to the existing load cells and to measure the differential voltage output by the existing load cells in response to the auxiliary excitation voltage. In the parallel mode, the telemetry scale device is arranged to measure the differential voltage output by the existing load cells and determine the weight of the agricultural product in the grain cart without interference to the existing scale device.

The switching device is preferably operable to disconnect a source of the excitation voltage of the existing scale device from the existing load cells in the primary mode of the telemetry scale device. The switching device in the illustrated embodiment is software controlled.

The switching device is preferably connected between the existing scale device and the existing load cells such that the existing scale device and the telemetry scale device form a parallel connection to the existing load cells relative to one another.

The apparatus may include a separate transmitting device in communication with the telemetry scale device so as to be arranged to transmit the weight determined by the telemetry scale device to an external computer device in real time.

When used on an agricultural cart connected in towed relation to an agricultural tractor, the telemetry scale device may be supported on the agricultural cart and the transmitting device may be supported on the agricultural tractor. In this instance, the telemetry scale device and the transmitting device are separate from one another and connected to one another by a wired connection.

The apparatus is preferably used together with an application executable on the external computer device so as to be arranged to (i) receive the determined weight transmitted wirelessly by the transmitting device in real time and (ii) transmit said weight over a communications network to a server. The application and the server may be components of a data management system in which the apparatus sends data to a network interface for processing, alerting, and reporting, etc. In some instance, the data management system may be an all-in-one farm management system.

The application may also be executable on the external computer device so as to be arranged to generate a load ticket representative of a difference in weight before and after an unloading of the agricultural cart. More particularly, the application in this instance may be arranged to: (i) determine when unloading of the agricultural cart has been initiated, (ii) record the determined weight of the agricultural product in the grain cart as a starting weight when unloading has been initiated, (iii) receive a load ticket command from a user, (iv) when the load ticket command has been received, determine an unloaded weight as a reduction in the determined weight of the agricultural product in the grain cart since the starting weight, and (v) storing the unloaded weight as a load ticket on the external computer device.

According to another aspect of the present invention there is provided a method of operating an agricultural cart arranged to transport an agricultural product therein and having existing load cells and an existing scale device in communication with the existing load cells so as to be arranged to deliver an excitation voltage to the load cells and measure a differential voltage output by the existing load cells to determine a weight of the agricultural product, the method comprising:

providing a telemetry scale device operatively connected to the existing scale device and the existing load cells; and using the telemetry scale device to measure the differential voltage output by the existing load cells and to determine the weight of the agricultural product in the grain cart without interference to the existing scale device.

The telemetry scale device is preferably also used to measure the excitation voltage delivered to the existing load cells by the existing scale device.

In some modes of operation, the telemetry scale device delivers an auxiliary excitation voltage to the existing load cells independently of the existing scale device. In this instance, the method includes disconnecting a source of the excitation voltage of the existing scale device from the existing load cells under software control prior to using the telemetry scale device to deliver the auxiliary excitation voltage to the existing load cells.

When providing a separate transmitting device in communication with the telemetry scale device, the transmitting device is preferably used to transmit the weight determined by the telemetry scale device to an external computer device in real time. In this instance, an application can be executed on the external computer device to (i) receive the determined weight transmitted wirelessly by the transmitting device in real time and (ii) generate a load ticket stored on the external computer device, the load ticket being representative of a difference in weight before and after an unloading of the agricultural cart.

BRIEF DESCRIPTION OF THE DRAWINGS

The details of the present disclosure as a method may be garnered in part by study of the accompanying drawings, in which the figures are referred to in numerals and are as follows.

In the drawings like characters of reference indicate corresponding parts in the different figures.

DETAILED DESCRIPTION

The methods and systems in this disclosure improve current operational standards of replacing OEM scale systems for collecting grain weights when farm management platforms are desired. This description relates to the use of a real-time telemetry weighing device installed on farm implements. The telemetry device captures harvest weight data where the device operates in parallel with existing grain cart scale heads.

This disclosure describes various methods and systems to facilitate the use of a telemetry weighing device installed on a grain carts that allows confirmation of actual measured weights utilized in the creation of yield maps. This technology operates in parallel with an existing original equipment manufacturer scale providing fixed excitation voltage. This system calculates the weight of grain in a grain cart, cleans the captured weights, creates load tickets, and can send the information live to the cloud for connection with a remote server, for example an all-in-one farm management system. The real-time telemetry device can be added to an existing measurement system meaning no disruption to operating procedures and easier adoption of more advanced technology by a grower. Information is collected more frequently with the method and a larger set of features and functionality not available in the OEM is accessible.

Current systems for measuring the weight of grain in a grain cart do not include support for a parallel mode of operation. In an OEM scale for a grain cart, one or more load cells are installed on a grain cart for weight collection and a traditional OEM measurement system provides excitation voltage to the load cells. The load cells in this instance are strain gauge load cells which typically have (i) a metal body arranged as a minimally elastic spring element that responds by deforming in an elastic manner when loaded with weight and (ii) strain gauges that are affixed to the spring element so that an alteration to the resistance in the strain gauges results when the strain gauges deform together with the elastic deformation of the spring element. This alteration to the resistance in the strain gauges can be measured as a differential voltage. Accordingly, the load cells convert the force applied from loading weight on the spring elements to a small differential voltage, which is proportional to an excitation voltage applied to the stain gauges by a source of excitation voltage on the OEM scale and the force applied by loading. The force is proportional to weight, thus the weight of the grain in the cart can be calculated.

Figure 1:
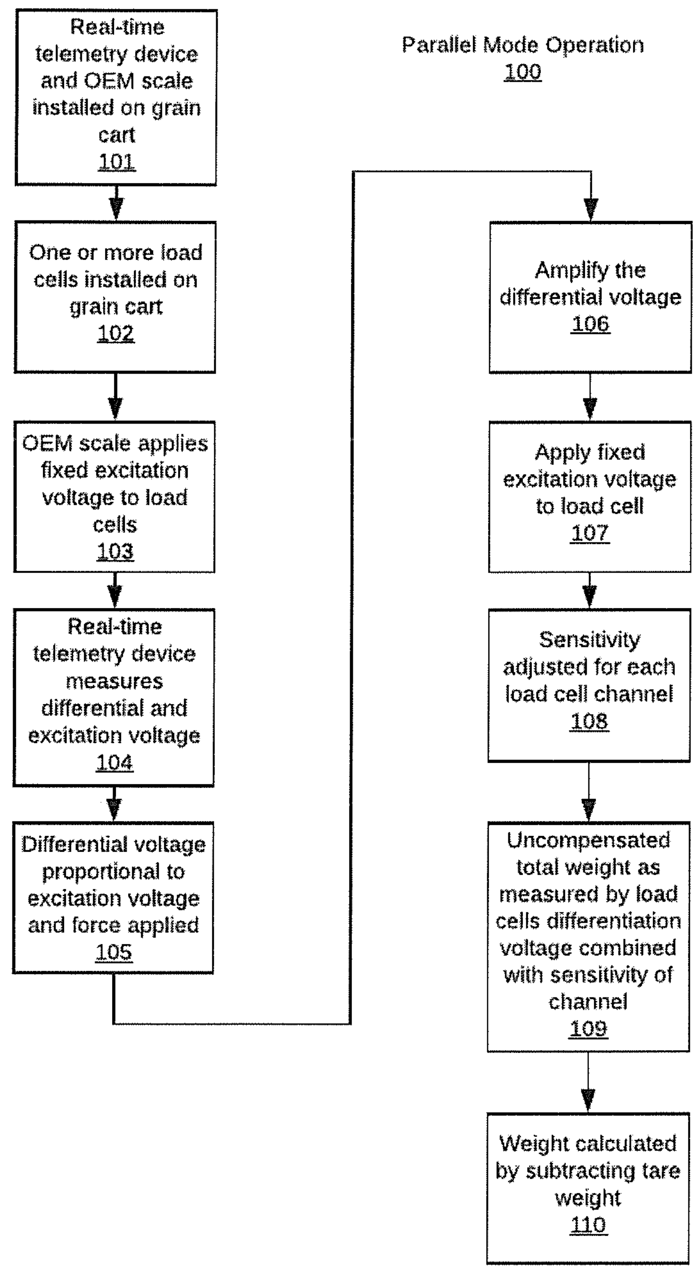
FIG. 1 is a flowchart of parallel mode operation of the real-time telemetry device for collecting crop weights from a grain cart.

FIG. 1 illustrates an overview of a parallel mode operation to calculate grain weight. A real-time telemetry weighing device 201 is installed on a grain cart 10 together with the OEM scale 302 on the grain cart as represented at step 101. One or more load cells 305 are provided on the grain cart 10 as noted at step 102. In one mode of operation, the OEM scale 302 applies a fixed excitation voltage from the voltage source of the OEM scale to the existing load cells of the grain cart as shown in step 103. The excitation voltage must be constant and is typically in the range of 5-10 volts. The real-time telemetry weighing device 201 measures the excitation voltage generated from the voltage source of the OEM scale 302 and the resulting differential voltage from the load cells 305 at step 104. The differential voltage is proportional to the excitation voltage and the force applied 105. The next step is amplification of the differential voltage 106.

A fixed excitation voltage can also be applied to the load cells 305 by an auxiliary voltage source of the telemetry scale device 201 as noted at step 107. This allows the sensitivity to be adjusted for each load cell channel at step 108. Each load cell channel is associated with one load cell among the set of load cells 305 on the grain cart 10. The uncompensated total weight, as measured by the differential voltage output by each load cell 305, is combined with the sensitivity of the channel 109 associated with that load cell so that resulting weight signals from the respective load cells can be combined. Weight is ultimately calculated by subtracting the tare weight from the combined weight of the load cells 305 in step 110.

Figure 2:
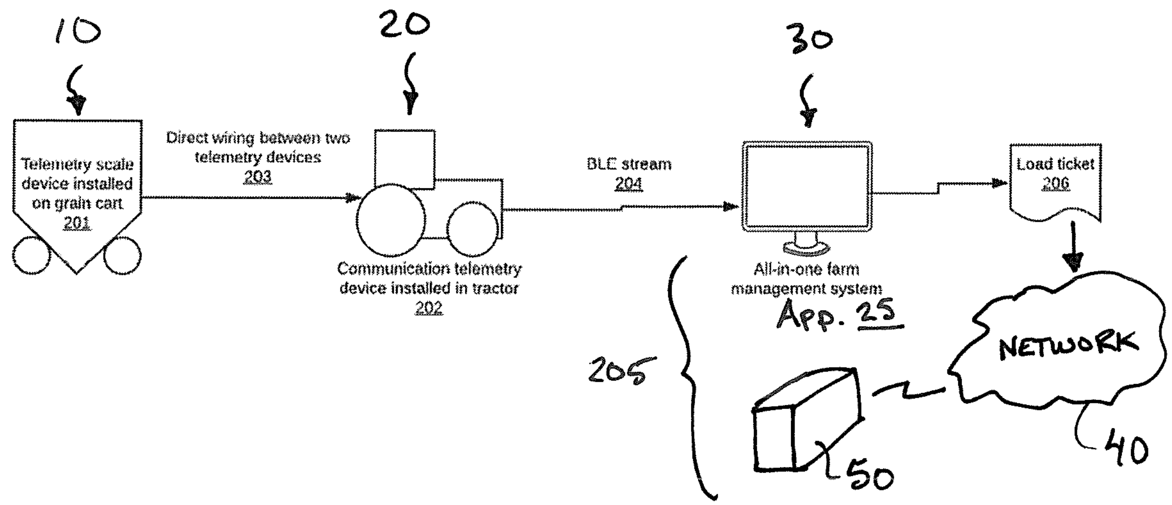
FIG. 2 is an illustration of a method to connect the real-time telemetry scale device with a remote data management system.

FIG. 2 shows an overview of the apparatus that operates in the parallel mode configuration to allow connection to a data management system, for example an all-in-one farm management system 205. A real-time telemetry device 201 for calculating the weight of grain in a grain cart 10 is a piece of hardware that will mount on the grain cart (implement) 10. The telemetry scale device 201 is a computer device including a processor arranged to execute programming instructions stored on a memory of the device to execute the various functions of the device as described herein.

The agricultural grain cart 10 is attached to an agricultural tractor (machine) 20 that has a second hardware device 202 installed within it. This second device 202 is a telematics transmitting device capable of communicating and collecting agricultural data. The hardware device 202 defining the transmitting device is a computer device including a processor arranged to execute programming instructions stored on a memory of the device to execute the various functions of the device as described herein.

The communication hardware 202 and the scale hardware 201 are directly wired to each other using a wired connection 203 in the illustrated embodiment; however, any form of remote communication including wired or wireless communication protocols can be used to communicate data between the communication hardware and the scale hardware. The scale hardware 201 behaves like a typical scale and captures weight signals from the load cells that are representative of the weight applied to the load cells on the grain cart. Captured weight signals fluctuate as the implement moves across the field as well as when the grain cart is filling or emptying.

The scale device 201 cleans the scale weight signals and sends them to the communication device 202. The communication device 202 receives those weight signals, converts them to a digital signal, and sends them by communication arrangement 204. An application in the data management system, for example an application of the all-in-one farm management system 205, is connected to the communication device 202 via the communication arrangement 204 and receives the cleaned scale weights, displaying them in the user interface of the data management system 205. The user initiates unloading using an unload command input into the tractor controls or into the interface of an all-in-one farm management system 205 that is in communication with the tractor and grain cart. As the scale 201 decreases, the amount of decrease is recorded as measured weight and the measured weight will accumulate. When the user has completed unloading, they initiate a load ticket 206 through a command input into the user interface of the all-in-one farm management system 205. At this time, the scale 201 may still be showing a weight, indicate zero, or even show a negative value. When the user creates the ticket 206, the amount of weight accumulated since the user selected unload will be applied to the load ticket 206 and saved. The user can then initiate another load ticket 206 by selecting unload and the above process will be repeated.

The communication arrangement 204 may be (i) a wired connection, for example using protocols such as RS-232, USB, RS-485, UART, etc., Ethernet, or other wired connection data transfer means, or (ii) a wireless connection, for example a Bluetooth low energy (BLE) stream, cellular, Wi-Fi, or other wireless signal bands.

The data management system 205 generally comprises an application 25 executed on a personal computer device 30 including a network interface to communicate over a network 40 with a remote central server 50. The data management system processes the data received, for example to determine if criteria have been met to generate alerts, or for reporting of data.

The personal computer device 30 may be for example a tablet or smartphone, external of the telemetry scale device 201 on the cart 10 and the transmitting device 202 on the tractor 20. As noted above, the telemetry scale device 201 and the transmitting device 202 are separate from one another, yet remain in communication with one another by a remote connection that may be wired or wireless. The personal computer device 30 includes a processor arranged to execute programming instructions stored on a memory thereof to execute the various functions of the computer device as described herein.

The application 25 is executable on the computer device 30 so as to be arranged to (i) receive the weight determined by the telemetry scale device 201 and transmitted wirelessly by the transmitting device 202 in real time over the communication arrangement 204 and (ii) transmit the determined weight over the communications network 40 to the central server 50 of the data management system in the form of a load ticket 206. The load ticket is representative of a difference in measured weight before and after an unloading of the agricultural cart.

The application is arranged to determine when unloading of the agricultural cart has been initiated by the user using controls in the tractor through the all-in-one farm management system. The application then records the determined weight of the agricultural product in the grain cart as a starting weight when unloading has been initiated. When a load ticket command has been initiated by a user and the application receives the load ticket command, the application determines an unloaded weight as a reduction in the real-time measured weight of the agricultural product in the grain cart since the starting weight initially recorded. This unloaded weight is then stored as a load ticket 206 on the computer device 30 to be transmitted over the communications network 40 to the central server 50 of the data management system.

Figure 3:
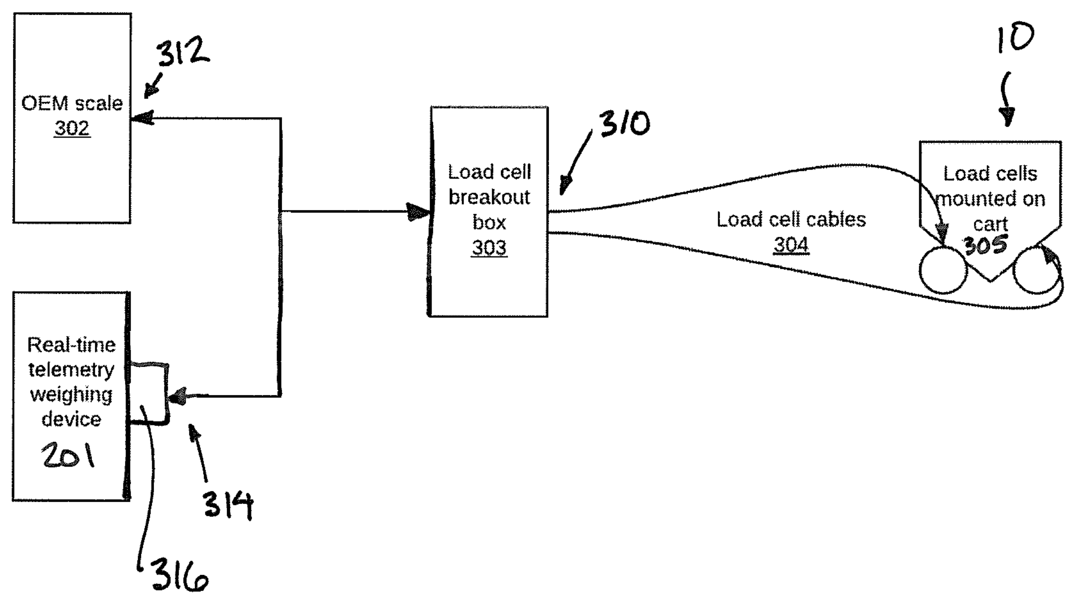
FIG. 3 shows the parallel mode configuration with the real-time telemetry weighing device connected to the OEM measurement system.

As shown in FIG. 3, the real-time telemetry weighing device 201 is connected with the existing OEM scale device 302 and the existing load cells 305 of the agricultural cart 10 using a breakout box 303. The breakout box 303 is a hardware device that interrupts the connecting load cell cables 304 used to connect OEM scale device 302 to the existing OEM load cells 305 of the grain cart. The breakout box 303 is an electronic hardware device with numerous connectors formed thereon including a set of first connectors 310 that connect to the load cells 305 via cables 304, a set of second connectors 312 that connect to the OEM scale device 302, and a set of third connectors 314 that connect to the telemetry scale device 201.

The breakout box 303 connects the OEM scale device 302, the telemetry scale device 201 and the load cells 305 such that a switching device 316 associated with the telemetry device 201 is effectively connected between the existing scale device 302 and the existing load cells 305. The existing scale device 302 and the telemetry scale device 201 thus form a parallel connection to the existing load cells 305 relative to one another.

In a parallel mode configuration shown in FIG. 3, both systems can read the differential voltage output by the load cells simultaneously without interference to the same set of load cells 305. Only one system can provide excitation voltage to the load cells 305. If both measurement systems fed excitation voltage to the same connection, excitation sources in both systems would interfere with one another, potentially leading to damage of the measurement systems or incorrect readings. The real-time telemetry weighing device is able to measure the excitation voltage provided by the OEM measurement system; this information is required to calculate weight.

Figure 4:
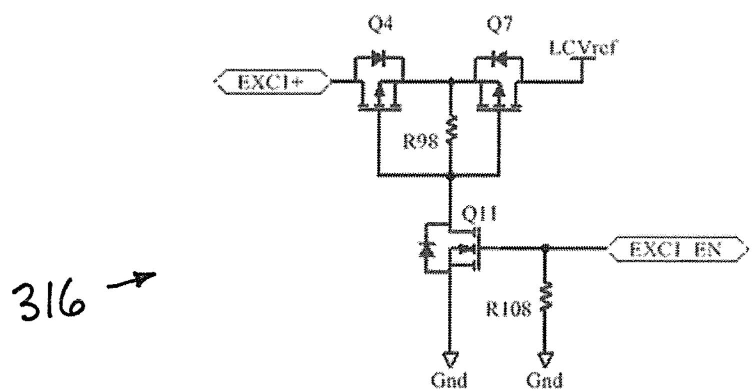
FIG. 4 illustrates switch circuitry for the real-time telemetry weighing device.

The real-time telemetry weighing device contains circuitry, shown in FIG. 4, that define the switching circuit device 316 and allows disconnection of the internal excitation source from all connectors. This switching device 316 is software controlled so the device can support two modes of operation acting as either the first system and providing excitation voltage or, alternatively, as a second, parallel system that only measures values.

The switching device 316 can be implemented using relays, solid state relays, opto-couplers, bipolar or field effect transistors (FET), multiplexers, or by using other methods. With the real-time telemetry weighing device, a back-to-back configuration of FETs is used and is shown in FIG. 4. Transistors Q4 and Q7 act as a bi-directional switch that connects or disconnects output of excitation source LCVref to output connector signal EXC1+. Transistor Q11 and R98 control the voltage on the gates of Q4 and Q7 to turn them on and off. Q11 is controlled by signal EXC1_EN from the microcontroller. R108 provides a safe state during the time when the microcontroller is initializing. A circuit is implemented for each load cell connector available on the device.

As described herein, the switching circuitry device 316 of the telemetry scale device 201 is operatively connected between the telemetry scale device 201 and the existing load cells 305 so that the switching device is arranged to operate the telemetry scale device in a primary mode or in a parallel mode. In the parallel mode, the telemetry scale device 201 is arranged to measure the differential voltage output by the existing load cells 305 in response to an excitation voltage from the OEM scale device 302 and determine the weight of the agricultural product in the grain cart without interference to the existing scale device 302.

In the primary mode, the telemetry scale device is arranged to deliver an auxiliary excitation voltage to the existing load cells from a voltage source of the telemetry scale device 201 and to measure the differential voltage output by the existing load cells 305 in response to the auxiliary excitation voltage. The switching device 316 is also operable to disconnect the source of the excitation voltage of the existing scale device 302 from the existing load cells 305 in the primary mode of the telemetry scale device.

To calculate the weight, the value of the load cell excitation voltage must be known. The real-time telemetry device contains circuitry that allows precise measurement of excitation voltage on all the connectors. The circuit contains a multiplexer that allows selection of the load cell channel to be measured. A signal from the multiplexer output is then buffered using an operational amplifier and fed to the analog digital converter (ADC). The ADC digitizes the signals and provides them to the microcontroller of the telemetry scale device 201 for a weight calculation.

The main benefit of the parallel mode system and method is that the end user can retain all of the original equipment manufacturer's equipment on the grain cart and tractor when the real-time telematics weighing device 201 is added. Growers tend to be more accepting of the new technology when there is no impact or interference on operating procedures. This method allows technology without risk to the grower's existing system.

Additional features are provided by the device that are not available on an OEM when the real-time telemetry weighing device is combined with a second telematics device 202 for communication live to the cloud. Information is collected with a greater frequency and the second telematics device 202 connects to an all-in-one farm management system, which affords accurate and reliable harvest results. Total field weights can be used to calibrate yield data for real-time field intelligence, inventory management, and post-season analysis. Verified yields translate into accurate yield maps, offering a tool to support decisions for the next growing season using exact figures.

Therefore, methods, systems, and apparatus for a parallel mode grain cart scale have been shown and described. The present invention contemplates numerous additions, options, and variations as may be appropriate in a particular environment, situation, or context. For example, the present invention contemplations variations in the make and model of OEM equipment, the circuit or logic used to allow for parallel operation of the real-time telemetry weighing device and OEM scale, and other variations, options, and alternatives.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A grain cart scale apparatus in combination with an agricultural cart for transporting an agricultural product therein, the agricultural cart comprising existing load cells and an existing scale device in communication with the existing load cells so as to be arranged to deliver an excitation voltage to the load cells and measure a differential voltage output by the existing load cells to determine a weight of the agricultural product, the grain cart scale apparatus comprising:

a telemetry scale device operatively connected to the existing scale device and the existing load cells;

the telemetry scale device being arranged to measure the differential voltage output by the existing load cells and determine the weight of the agricultural product in the grain cart without interference to the existing scale device being arranged to deliver the excitation voltage to the load cells and measure the differential voltage output by the existing load cells.

2. The apparatus according to claim 1 wherein the telemetry scale device is arranged to measure the excitation voltage delivered to the existing load cells by the existing scale device.

3. The apparatus according to claim 1 wherein the telemetry scale device is arranged to deliver an auxiliary excitation voltage to the existing load cells independently of the existing scale device.

4. A grain cart scale apparatus for use with an agricultural cart for transporting an agricultural product therein including existing load cells and an existing scale device in communication with the existing load cells so as to be arranged to deliver an excitation voltage to the load cells and measure a differential voltage output by the existing load cells to determine a weight of the agricultural product, the grain cart scale apparatus comprising:

a telemetry scale device arranged to be operatively connected to the existing scale device and the existing load cells; and a switching device operatively connected between the telemetry scale device and the existing load cells, the switching device being arranged to operate the telemetry scale device in a primary mode or in a parallel mode;

in the primary mode, the telemetry scale device is arranged to deliver an auxiliary excitation voltage to the existing load cells and to measure the differential voltage output by the existing load cells in response to the auxiliary excitation voltage; and in the parallel mode, the telemetry scale device being arranged to measure the differential voltage output by the existing load cells and determine the weight of the agricultural product in the grain cart without interference to the existing scale device.

5. The apparatus according to claim 4 wherein the switching device is operable to disconnect a source of the excitation voltage of the existing scale device from the existing load cells in the primary mode of the telemetry scale device.

6. The apparatus according to claim 4 wherein the switching device is software controlled.

7. The apparatus according to claim 4 wherein the switching device is arranged to be connected between the existing scale device and the existing load cells such that the existing scale device and the telemetry scale device form a parallel connection to the existing load cells relative to one another.

8. The apparatus according to claim 1 further comprising a transmitting device in communication with the telemetry scale device so as to be arranged to transmit the weight determined by the telemetry scale device to an external computer device in real time.

9. The apparatus according to claim 8 in combination with the agricultural cart and an agricultural tractor in towing connection with the agricultural cart, the telemetry scale device being supported on the agricultural cart and the transmitting device being supported on the agricultural tractor.

10. The apparatus according to claim 8 wherein the telemetry scale device and the transmitting device are separate from one another and communicate remotely with one another.

11. The apparatus according to claim 8 further comprising an application executable on the external computer device so as to be arranged to (i) receive the determined weight transmitted wirelessly by the transmitting device in real time and (ii) transmit said weight over a communications network to a server, the application and the server being components of a data management system.

12. The apparatus according to claim 11 wherein the data management system is an all-in-one farm management system for processing data and reporting the processed data.

13. The apparatus according to claim 8 further comprising an application executable on the external computer device so as to be arranged to (i) receive the determined weight transmitted wirelessly by the transmitting device in real time and (ii) generate a load ticket representative of a difference in weight before and after an unloading of the agricultural cart.

14. A grain cart scale apparatus for use with an agricultural cart for transporting an agricultural product therein including existing load cells and an existing scale device in communication with the existing load cells so as to be arranged to deliver an excitation voltage to the load cells and measure a differential voltage output by the existing load cells to determine a weight of the agricultural product, the grain cart scale apparatus comprising:

a telemetry scale device arranged to be operatively connected to the existing scale device and the existing load cells, the telemetry scale device being arranged to measure the differential voltage output by the existing load cells and determine the weight of the agricultural product in the grain cart without interference to the existing scale device;

a transmitting device in communication with the telemetry scale device so as to be arranged to transmit the weight determined by the telemetry scale device to an external computer device in real time; and an application executable on the external computer device so as to be arranged to (i) receive the determined weight transmitted wirelessly by the transmitting device in real time and (ii) generate a load ticket representative of a difference in weight before and after an unloading of the agricultural cart;

wherein the application is arranged to:

determine when unloading of the agricultural cart has been initiated;

record the determined weight of the agricultural product in the grain cart as a starting weight when unloading has been initiated;

receive a load ticket command from a user;

when the load ticket command has been received, determine an unloaded weight as a reduction in the determined weight of the agricultural product in the grain cart since the starting weight; and store the unloaded weight as a load ticket on the external computer device.

15. A method of operating an agricultural cart arranged to transport an agricultural product therein, the method comprising:

providing the agricultural cart with existing load cells and an existing scale device in communication with the existing load cells so as to be arranged to deliver an excitation voltage to the load cells and measure a differential voltage output by the existing load cells to determine a weight of the agricultural product;

providing a telemetry scale device operatively connected to the existing scale device and the existing load cells; and using the telemetry scale device to measure the differential voltage output by the existing load cells and to determine the weight of the agricultural product in the grain cart without interference to the existing scale device being arranged to deliver the excitation voltage to the load cells and measure the differential voltage output by the existing load cells.

16. The method according to claim 15 including using the telemetry scale device to measure the excitation voltage delivered to the existing load cells by the existing scale device.

17. The method according to claim 15 including using the telemetry scale device to deliver an auxiliary excitation voltage to the existing load cells independently of the existing scale device.

18. The method according to claim 17 including disconnecting a source of the excitation voltage of the existing scale device from the existing load cells under software control prior to using the telemetry scale device to deliver the auxiliary excitation voltage to the existing load cells.

19. The method according to claim 15 including providing a transmitting device in communication with the telemetry scale device and using the transmitting device to transmit the weight determined by the telemetry scale device to an external computer device in real time.

20. The method according to claim 19 including using an application executed on the external computer device to (i) receive the determined weight transmitted wirelessly by the transmitting device in real time and (ii) generate a load ticket stored on the external computer device, the load ticket being representative of a difference in weight before and after an unloading of the agricultural cart.

* * * * *